(12) United States Patent
Lu et al.

(10) Patent No.: US 10,516,570 B1
(45) Date of Patent: Dec. 24, 2019

(54) SYSTEMS AND METHODS FOR TAGGING CLIENT DEVICES

(71) Applicant: Symantec Corporation, Mountain View, CA (US)

(72) Inventors: Jin Lu, Campbell, CA (US); Ramakrishnan Meenakshi Sundaram, Chennai (IN)

(73) Assignee: NortonLifeLock Inc., Tempe, AZ (US)

( * ) Notice: Subject to any disclaimer, the term of this patent is extended or adjusted under 35 U.S.C. 154(b) by 100 days.

(21) Appl. No.: 15/716,868

(22) Filed: Sep. 27, 2017

(51) Int. Cl.
*H04J 99/00* (2009.01)
*H04L 12/24* (2006.01)
*H04L 29/12* (2006.01)
*H04L 29/06* (2006.01)

(52) U.S. Cl.
CPC ...... *H04L 41/0806* (2013.01); *H04L 61/6022* (2013.01); *H04L 63/20* (2013.01)

(58) Field of Classification Search
None
See application file for complete search history.

(56) References Cited

U.S. PATENT DOCUMENTS

| 9,781,602 | B1* | 10/2017 | Girdhar | H04W 4/70 |
| 2009/0204685 | A1* | 8/2009 | Feuerman | H04L 29/12141 |
| | | | | 709/217 |
| 2014/0254546 | A1* | 9/2014 | L'Heureux | H04W 12/06 |
| | | | | 370/331 |
| 2014/0259147 | A1* | 9/2014 | L'Heureux | H04L 63/02 |
| | | | | 726/14 |
| 2014/0280840 | A1* | 9/2014 | Satapathy | H04L 67/1097 |
| | | | | 709/223 |
| 2018/0234294 | A1* | 8/2018 | Wadekar | H04L 41/0806 |

OTHER PUBLICATIONS

HomeKit; WWDC 2017; https://developer.apple.com/homekit/ as accessed on Oct. 24, 2017.

* cited by examiner

*Primary Examiner* — Candal Elpenord
*Assistant Examiner* — Juvena W Loo
(74) *Attorney, Agent, or Firm* — FisherBroyles, LLP

(57) ABSTRACT

The disclosed computer-implemented method for tagging client devices may include (i) receiving from a router at least one network packet that indicates that a client device has attempted to connect to the router and that includes device information identifying the client device, (ii) prompting, automatically in response to receiving the network packet indicating that the client device has attempted to connect to the router, a user to tag the client device with a descriptive name to facilitate management of the client device, (iii) receiving, in response to prompting the user to tag the client device, a tag that indicates a specific descriptive name for the client device, and (iv) transmitting, automatically in response to receiving the tag, the specific descriptive name to at least one of the router and a cloud security server. Various other methods, systems, and computer-readable media are also disclosed.

20 Claims, 6 Drawing Sheets

SYSTEMS AND METHODS FOR TAGGING CLIENT DEVICES

BACKGROUND

It is important for a router to discover and identify Internet-of-Things client devices that are attempting to connect with the router. A security service can reference these discovered client devices when performing network traffic pattern analysis, security profiling, Internet-of-Things insight analysis, and parental control. For example, if suspicious traffic is detected at a client device, that client device can be notified or quarantined. The security service can analyze traffic patterns on a client-by-client basis. The user may analyze or manage Internet usage in terms of client devices.

In one conventional system, the security service may discover client devices through protocols such as DYNAMIC HOST CONFIGURATION PROTOCOL and network traffic such as HYPERTEXT TRANSFER PROTOCOL traffic. The security service may identify these discovered devices by their MEDIA ACCESS CONTROL addresses and/or non-descriptive host names or machine brand names, such as "android-baf41bebeod6d2cd" or "L-253724-P15." The router may be able to derive some information from the MEDIA ACCESS CONTROL address and/or other network packet analysis. For example, the router may be able to derive the manufacturer and/or device type. Nevertheless, the derived information is not user-friendly when presented to users or administrators. In general, the users may resort to guessing what each device is based on the cryptic and non-descriptive device identifiers. The instant disclosure, therefore, identifies and addresses a need for systems and methods for tagging client devices.

SUMMARY

As will be described in greater detail below, the instant disclosure describes various systems and methods for tagging client devices. In one example, a computer-implemented method for tagging client devices may include (i) receiving from a router at least one network packet that indicates that a client device has attempted to connect to the router and that includes device information identifying the client device, (ii) prompting, automatically in response to receiving the network packet indicating that the client device has attempted to connect to the router, a user to tag the client device with a descriptive name to facilitate management of the client device, (iii) receiving, in response to prompting the user to tag the client device, a tag that indicates a specific descriptive name for the client device, and (iv) transmitting, automatically in response to receiving the tag, the specific descriptive name to at least one of the router and a cloud security server to establish, within a security service record, an association between the specific descriptive name and the client device.

In one embodiment, the computer-implemented method may further include, prior to receiving the network packet that indicates that the client device has attempted to connect to the router, transmitting a request to the router to subscribe to a device-connected event that occurs within a specified window of time. In further embodiments, the computer-implemented method may further include, prior to receiving the network packet that indicates that the client device has attempted to connect to the router, receiving from the router a list of client devices that are already connected to the router, the list including the client device. In some examples, the computer-implemented method may further include prompting the user to reconnect the client device to a network of the router in response to receiving from the router the list of client devices that are already connected to the router. In further examples, the computer-implemented method may further include prompting the user to reconnect every device in the list of client devices to the network of the router.

In one embodiment, the router transmits the network packet in response to intercepting the client device attempting to connect to the router. In a further embodiment, the router prevents the client device from connecting to the router until the tag that indicates the specific descriptive name for the client device is received.

In one embodiment, the device information identifying the client device includes a media access control address of the client device. Moreover, in this embodiment, establishing, within the security service record, the association between the specific descriptive name and the client device includes establishing an association between the specific descriptive name and the media access control address.

In one embodiment, the router establishes a wireless network according to at least one of the following protocols: (i) WIFI, (ii) BLUETOOTH LOW ENERGY, (iii) ZIGBEE, and/or (iv) Z-WAVE. In some examples, prompting the user to tag the client device with the descriptive name to facilitate management of the client device may include displaying the device information identifying the client device.

In one embodiment, a system for implementing the above-described method may include (i) a reception module, stored in memory, that receives from a router at least one network packet that indicates that a client device has attempted to connect to the router and that includes device information identifying the client device, (ii) a prompting module, stored in memory, that prompts, automatically in response to receiving the network packet indicating that the client device has attempted to connect to the router, a user to tag the client device with a descriptive name to facilitate management of the client device, (iii) where the reception module receives, in response to prompting the user to tag the client device, a tag that indicates a specific descriptive name for the client device, (iv) a transmission module, stored in memory, that transmits, automatically in response to receiving the tag, the specific descriptive name to at least one of the router and a cloud security server to establish, within a security service record, an association between the specific descriptive name and the client device, and (v) at least one physical processor configured to execute the reception module, the prompting module, and the transmission module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive from a router at least one network packet that indicates that a client device has attempted to connect to the router and that includes device information identifying the client device, (ii) prompt, automatically in response to receiving the network packet indicating that the client device has attempted to connect to the router, a user to tag the client device with a descriptive name to facilitate management of the client device, (iii) receive, in response to prompting the user to tag the client device, a tag that indicates a specific descriptive name for the client device, and (iv) transmit, automatically in response to receiving the tag, the specific descriptive name to at least one of the router and a cloud security server to establish, within a security service record, an association between the specific descriptive name and the client device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
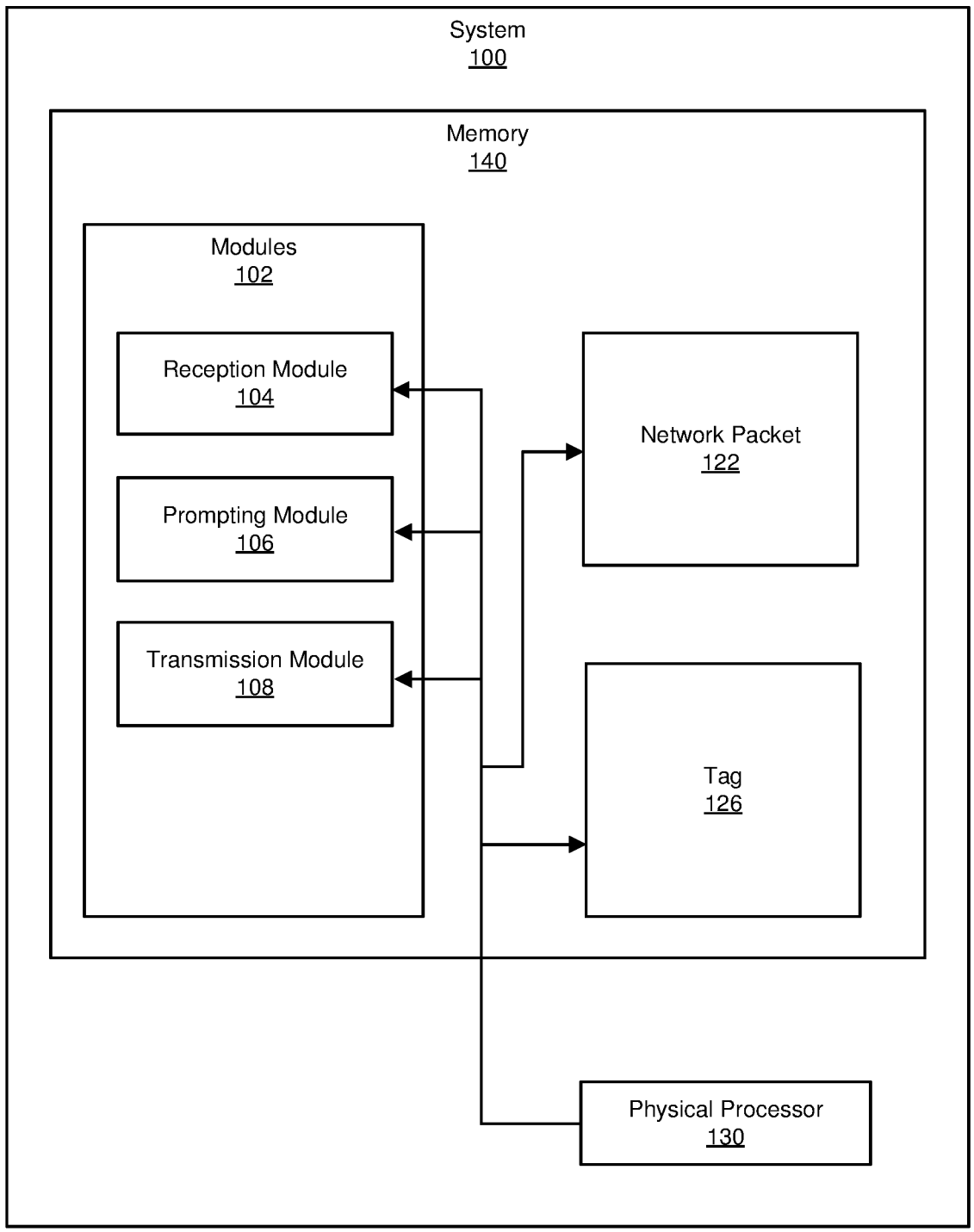
FIG. 1 is a block diagram of an example system for tagging client devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for tagging client devices. In general, the disclosed systems and methods may improve the device management of client devices, such as Internet-of-Things devices, that connect to a router. Instead of forcing a user to reference generic, random, and/or non-descriptive device identifiers, the disclosed systems and methods may instead enable the user to tag these client devices with user-friendly and descriptive names. Accordingly, when the user, or another administrator, references connected client devices within a security service program, the user may more readily and conveniently ascertain the identity of each client device by referencing the user-friendly name rather than a generic and non-descriptive name, as discussed further below.

Figure 2:
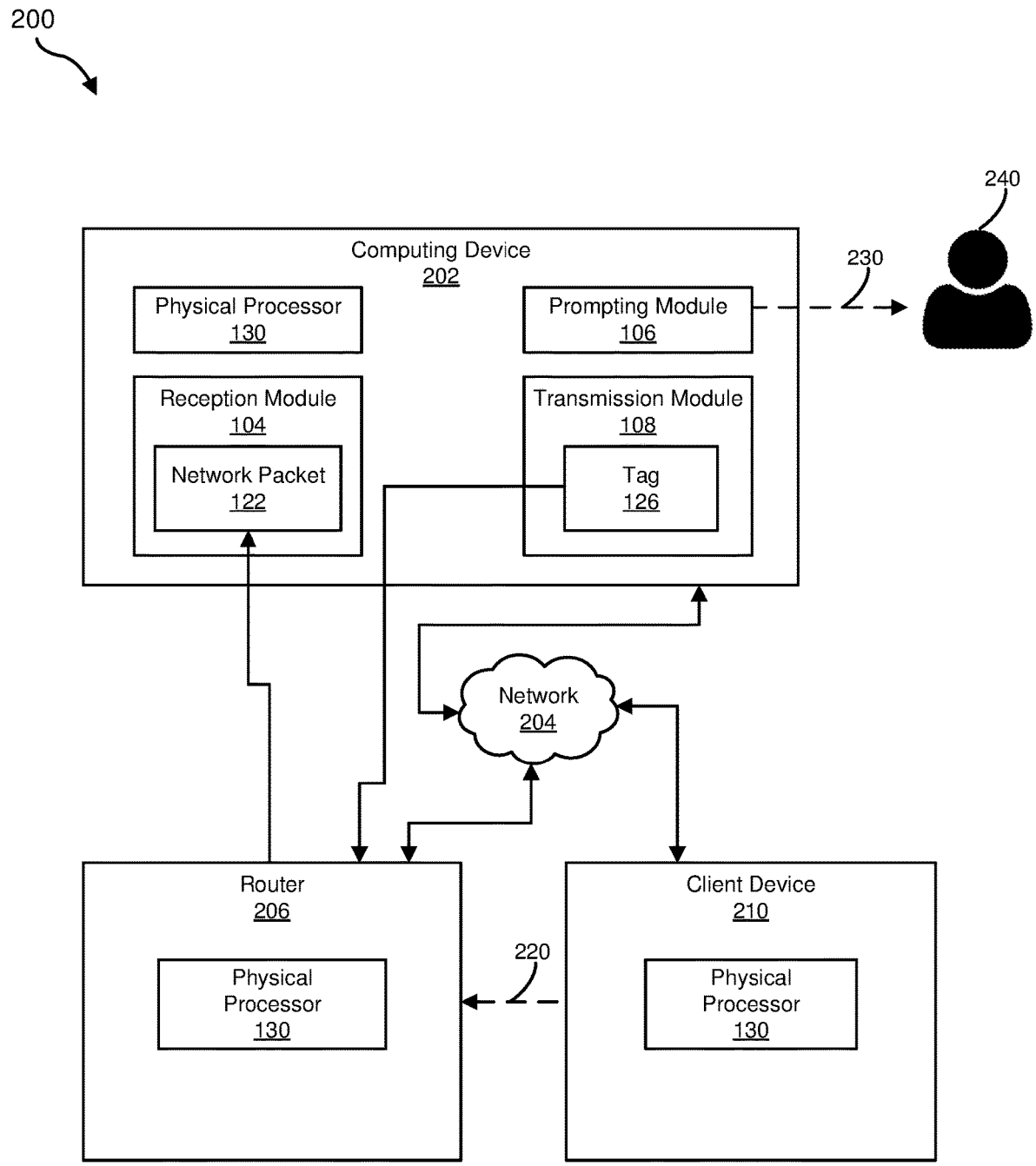
FIG. 2 is a block diagram of an additional example system for tagging client devices.

The following will provide, with reference to FIGS. 1-2, detailed descriptions of example systems for tagging client devices. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for tagging client devices. As illustrated in this figure, example system 100 may include one or more modules 102 for performing one or more tasks. For example, and as will be explained in greater detail below, example system 100 may include a reception module 104 that receives from a router at least one network packet, such as a network packet 122, that indicates that a client device has attempted to connect to the router and that includes device information identifying the client device. Example system 100 may additionally include a prompting module 106 that prompts, automatically in response to receiving the network packet indicating that the client device has attempted to connect to the router, a user to tag the client device with a descriptive name to facilitate management of the client device. In this example, reception module 104 may also receive, in response to prompting the user to tag the client device, a tag 126 that indicates a specific descriptive name for the client device. Example system 100 may also include a transmission module 108 that transmits, automatically in response to receiving tag 126, the specific descriptive name to at least one of the router and a cloud security server to establish, within a security service record, an association between the specific descriptive name and the client device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or router 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate tagging client devices. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a router 206 via a network 204. In one example, all or a portion of the functionality of modules 102 may be performed by computing device 202, router 206, and/or any other suitable computing system.

As will be described in greater detail below, one or more of modules 102 from FIG. 1 may, when executed by at least one processor of computing device 202 and/or router 206, enable computing device 202 and/or router 206 to tag client devices. For example, and as will be described in greater detail below, reception module 104 may receive from router 206 at least one network packet, such as network packet 122, that indicates that a client device 210 has attempted (e.g., in an attempt 220) to connect to router 206 and that includes device information identifying client device 210. In this example, client device 210 may have another instance of physical processor 130 that parallels the instance in computing device 202. In more specific examples, client device 210 may constitute an Internet-of-Things device. Prompting module 106 may prompt (e.g., in a displayed prompt 230), automatically in response to reception module 104 receiving network packet 122 indicating that client device 210 has attempted to connect to router 206, a user 240 to tag client device 210 with a descriptive name to facilitate management of client device 210. Reception module 104 may receive, in response to prompting module 106 prompting user 240 to tag client device 210, tag 126 that indicates a specific descriptive name for client device 210. Transmission module 108 may transmit, automatically in response to reception module 104 receiving tag 126, the specific descriptive name to at least one of router 206 and a cloud security server to establish, within a security service record, an association between the specific descriptive name and client device 210.

Computing device 202 generally represents any type or form of computing device capable of reading computer-executable instructions. In some example embodiments, computing device 202 may correspond to a smartphone that executes modules 102 as part of a mobile application. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device. Client device 210 may parallel computing device 202 in the sense that client device 210 may take the form of any one or more of the examples listed above.

Router 206 generally represents any type or form of computing device that is capable of routing network packets. In some examples, router 206 may be part of, or connected to, one or more servers, such as security servers, application servers, web servers, storage servers, and/or database servers configured to run certain software applications and/or provide various security, web, storage, and/or database services. Although illustrated as a single entity in FIG. 2, router 206 may include, connect to, and/or represent a plurality of servers that work and/or operate in conjunction with one another.

Network 204 generally represents any medium or architecture capable of facilitating communication or data transfer. In one example, network 204 may facilitate communication between computing device 202 and router 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

In some specific examples, network 204 may be established by router 206. In these examples, the router may establish network 204 according to one or more of the following protocols: (i) WIFI, (ii) BLUETOOTH LOW ENERGY, (iii) ZIGBEE, and/or (iv) Z-WAVE.

Figure 3:
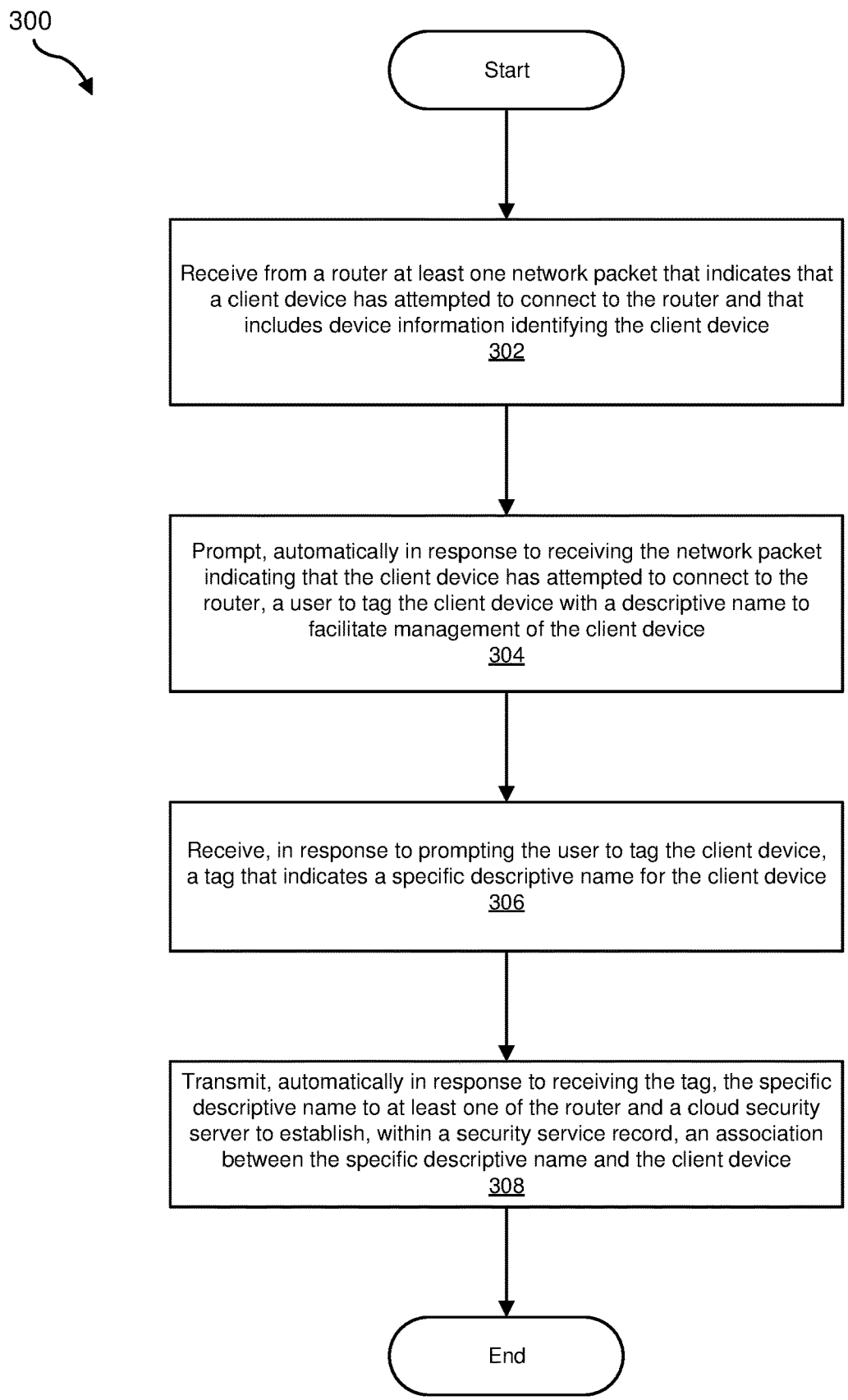
FIG. 3 is a flow diagram of an example method for tagging client devices.

FIG. 3 is a flow diagram of an example computer-implemented method 300 for tagging client devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive from a router at least one network packet that indicates that a client device has attempted to connect to the router and that includes device information identifying the client device. For example, reception module 104 may, as part of computing device 202 in FIG. 2, receive from router 206 network packet 122 that indicates that client device 210 has attempted to connect to router 206 and that includes device information identifying client device 210.

As used herein, the phrase "at least one network packet" generally refers to a single network packet indicating that the client device is attempting to connect to the router or, instead, a plurality of network packets that together indicate that the client device is attempting to connect to the router. For style and ease of discussion, subsequent references to the "at least one network packet" omit the phrase "at least one," but the entire phrase is intended to be implicit throughout this application. Additionally, as used herein, the phrase "attempted to connect to the router" generally refers to the client device transmitting one or more network packets to the router in an attempt to establish a connection to a network provided, or managed, by the router.

Reception module 104 may receive the network packet in a variety of ways. In some examples, reception module 104 may receive the network packet from the router after the client device attempts to connect to the router for the first time. In these examples, prior to reception module 104 receiving the network packet, transmission module 108 may optionally transmit a request to the router to subscribe to a device-connected event detected by the router within a specified window of time. In specific examples, the window of time may have a length on the order of seconds or minutes. The transmission of the request to the router may successfully subscribe reception module 104 to updates or notifications that the router may transmit when detecting any attempt by a client device to connect to the router. Upon successfully subscribing to the updates or notifications, user

240 may connect the network device to a network, such as a wireless network, of the router. In the example of a WIFI network, user 240 may identify a SERVICE SET IDENTIFIER for the router and then successfully sign into the router using a username and password for the router.

Successfully signing into the router may trigger the router to further transmit the device information identifying the client device to reception module 104. In some examples, the device information may include a MEDIA ACCESS CONTROL address and/or a host name or manufacturer identifier for the client device. These items of information may be user-non-friendly, generic, random, and/or uninformative, in contrast to a descriptive name with which a user may specifically tag the client device, as discussed further below in connection with step 306.

In other examples, reception module 104 may receive the network packet in response to the client device reconnecting to the router after the client device was previously connected to the router. In these examples, transmission module 108 may transmit a request to the router for a list of client devices that are already connected to the router. The list may include the client device. In response, reception module 104 may receive the list of client devices that are already connected to the router. Moreover, prior to reception module 104 receiving the network packet indicating that the client device has attempted to connect to the router (i.e., attempted to re-connect to the router in this example), prompting module 106 may further prompt user 240 to re-connect the client device to the router. Moreover, in these examples, prompting module 106 may optionally prompt user 240 to re-connect every client device in the list of client devices that are already connected to the router, or re-connect each client device in the list that the user selects for tagging, as discussed further below.

In some examples, a security service executing at the router may prevent the client device from connecting to the router until the tag that indicates the specific descriptive name for the client device is received at step 306, as discussed further below. In other words, the security service may condition connection to the router on successful receipt of the tag from the user. In other examples, the security service executing at the router may enable the client device to connect to the router immediately and prior to reception of the tag at step 306. In these examples, tagging the client device to improve or facilitate device management may be optional. Accordingly, prompting module 106 may prompt a user to optionally tag the client device, and the user may actually tag the client device or not.

At step 304, one or more of the systems described herein may prompt, automatically in response to receiving the network packet indicating that the client device has attempted to connect to the router, a user to tag the client device with a descriptive name to facilitate management of the client device. For example, prompting module 106 may, as part of computing device 202 in FIG. 2, prompt, automatically in response to reception module 104 receiving network packet 122 indicating that client device 210 has attempted to connect to router 206, user 240 to tag client device 210 with a descriptive name to facilitate management of client device 210.

As used herein, the term "tag" generally refers to an alphanumeric string, or other string of characters, specified to name or identify the client device. Moreover, as used herein, the term "descriptive name" generally refers to any name that describes, at least in part, directly or indirectly, the client device. In other examples, prompting module 106 may prompt a user to tag the client device with a descriptive or non-descriptive name.

Figure 4:
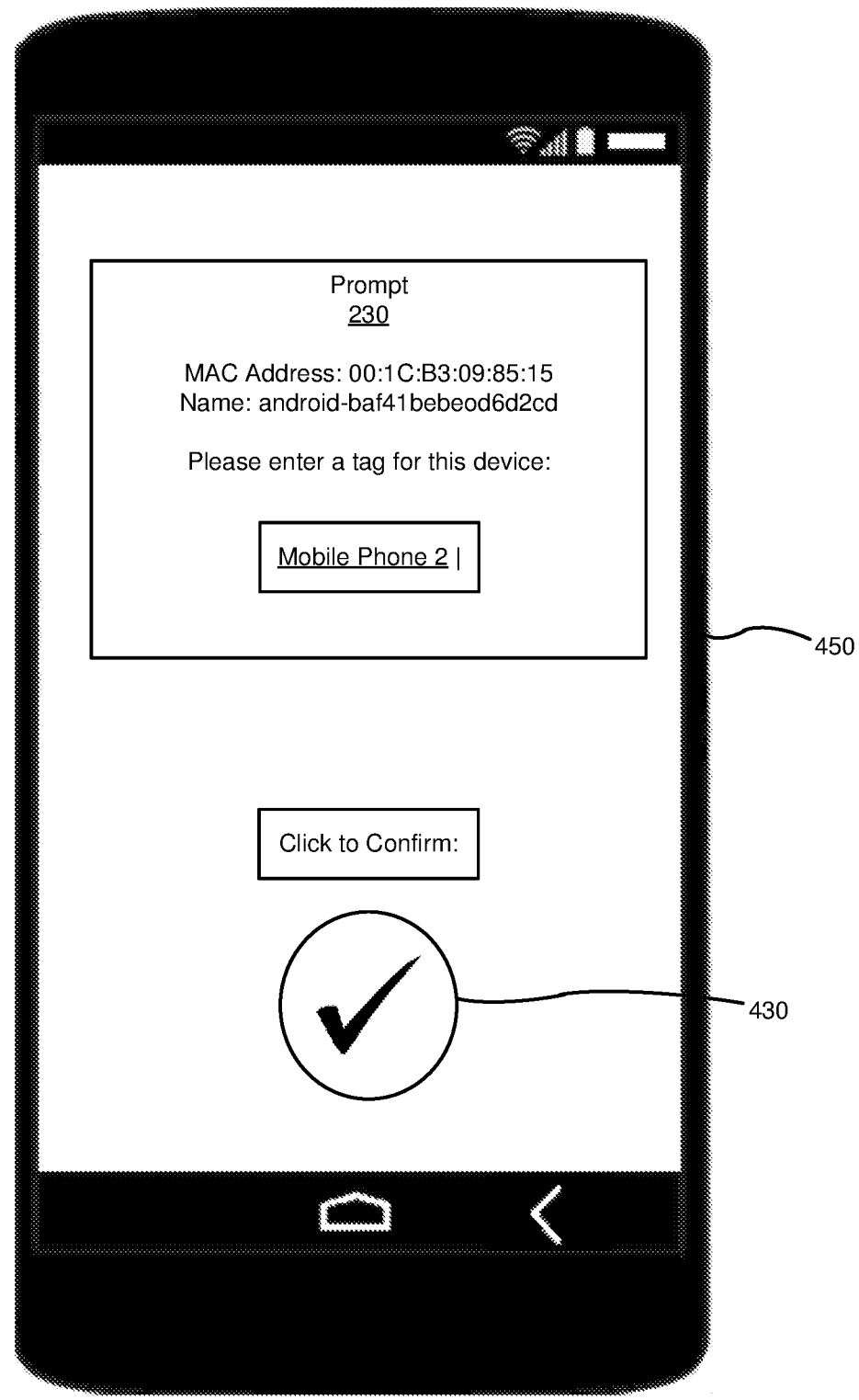
FIG. 4 is a block diagram of an example smartphone display that further illustrates part of an example method for tagging client devices.

Prompting module 106 may prompt user 240 to tag the client device in a variety of ways. FIG. 4 shows a block diagram of an example smartphone display of a smart phone 450 that further illustrates the performance of step 304. In this example, prompting module 106 may prompt the user to tag the client device with the descriptive name to facilitate management of the client device at least in part by displaying the device information identifying the client device. In other words, as further shown in this example, prompt 230 may specify the device information, included within the network packet, that identifies the client device. In this example, the MEDIA ACCESS CONTROL address for the client device may be "00:1C:B3:09:85:15." Furthermore, the name for the client device may be "android-baf41bebeod6d2cd." This name may correspond to a host name, such as a DYNAMIC HOST CONFIGURATION PROTOCOL host name, and/or a manufacturer-specified name, brand, and/or model.

As further shown in this figure, prompt 230 may further prompt the user to enter the tag for the client device. In this specific example, prompt 230 prompts the user with the string "[p]lease enter a tag for this device." In response, user 240 has input, or typed, a tag that indicates, or specifies, a descriptive name for the client device. Specifically, user 240 has input the descriptive name "Mobile Phone 2" for the client device attempting to connect to the router. The descriptive name "Mobile Phone 2" may indicate that the client device attempting to connect to the router is a second mobile phone belonging to the user, as distinct from smartphone 450 shown in FIG. 4. In other examples, the client device may correspond to any suitable Internet-of-Things device, as discussed further above, and the user may tag the client device with a descriptive name that describes the nature of, and/or the identity of, the specific Internet-of-Things device. Lastly, in the example of FIG. 4, prompting module 106 further prompts a user 240 to click a checkmark 430 to confirm that user 240 wishes to tag the client device with the descriptive name that the user input for the client device.

At step 306, one or more of the systems described herein may receive, in response to prompting the user to tag the client device, a tag that indicates a specific descriptive name for the client device. For example, reception module 104 may, as part of computing device 202 in FIG. 2, receive, in response to prompting module 106 prompting the user to tag client device 210, tag 126 that indicates a specific descriptive name for client device 210.

Reception module 104 may receive the specific descriptive name in a variety of ways. In the example of FIG. 4, reception module 104 receives the specific descriptive name "Mobile Phone 2," as further discussed above. Reception module 104 may receive the specific descriptive name using any suitable input channel, including a touchscreen, a keyboard, a mouse, and/or a microphone (e.g., through voice recognition and dictation). Reception module 104 may also receive the descriptive name through a webpage as the user interface. The webpage may optionally be hosted on the router and/or a cloud security server. In general, reception module 104 may receive the specific descriptive name using any input channel that transmits, or specifies, alphanumeric characters or other symbols.

At step 308, one or more of the systems described herein may transmit, automatically in response to receiving the tag, the specific descriptive name to at least one of the router and a cloud security server to establish, within a security service record, an association between the specific descriptive name and the client device. For example, transmission module 108 may, as part of computing device 202 in FIG. 2, transmit, automatically in response to receiving tag 126, the specific descriptive name to at least one of router 206 and a cloud security server to establish, within a security service record, an association between the specific descriptive name and client device 210.

As used herein, the phrase "establish [ . . . ] an association" generally refers to writing to computing memory an indication that two items (e.g., the specific descriptive name and the client device) are associated, linked, and/or correlated. In other words, the phrase generally refers to writing to computing memory to indicate that the specific descriptive name constitutes a name for the client device. In general, transmission module 108 may transmit the specific descriptive name to router 206 and/or the cloud security server to enable the recipient to write to computing memory to establish the association between the specific descriptive name and the client device.

The security service at the router and/or the cloud security server may establish the association between the specific descriptive name and the client device in a variety of ways. In some examples, the security service may populate the fields of the security service record corresponding to the specific descriptive name and corresponding to the client device, respectively. More specifically, in some examples the security service may populate a field for the specific descriptive name and also populate a field for the client device along the same row or call of a database table. In some examples, the security service may populate fields of a data structure that correspond to the specific descriptive name and correspond to the client device, respectively. In further examples, the security service may populate the field for the client device with an additional identifier for the client device (i.e., other than the specific descriptive name), such as the MEDIA ACCESS CONTROL address and/or host name or manufacturer-specified name, as further discussed above. The security service may thereby link the specific descriptive name with the client device, thereby indicating their association in accordance with step 308.

Moreover, as used herein, the phrase "a security service record" generally refers to a database record, data structure, file, or other item of computing memory, that stores data for a security service or program. The security service may perform network traffic pattern analysis, security profiling, Internet-of-Things insight analysis, and/or parental control. The security service may correspond to a program, agent, script, and/or process that executes at router 206 and/or the cloud security server. Furthermore, as used herein, the term "cloud security server" generally refers to any cloud server that executes all or part of the security service, as further discussed above.

Transmission module 108 may transmit the descriptive name to router 206 and/or the cloud security server in a variety of ways. In general, transmission module 108 may transmit the descriptive name in response to reception module 104 receiving the descriptive name at step 306. Transmission module 108 may be configured to transmit the descriptive name automatically to router 206 and/or the cloud security server. Alternatively, the user, or an administrator, may select whether transmission module 108 transmits the descriptive name to router 206, the cloud security server, or both. Transmission module 108 may further include, within the transmission, an instruction for the recipient (e.g., router 206 and/or the cloud security server) to establish the association between the specific descriptive name and the client device, as further discussed above.

The above discussion provided an overview of the disclosed systems and methods in accordance with the flow diagram of FIG. 3. Additionally, the following discussion provides an additional overview of concrete examples of the disclosed systems and methods.

A security service executing on a router (e.g. NORTON CORE router) may have the ability to intercept devices joining a WIFI or LAN network. The security service may use these interceptions to prompt a homeowner or administrator to tag one or more of the intercepted devices with a user-friendly name, or other descriptive name. The security service may optionally prompt the homeowner or administrator to input the tag through a mobile device application. Upon receiving the tag, the disclosed systems and methods may transmit the tag to the router and/or a cloud security server, where the tag may be associated with the MEDIA ACCESS CONTROL address for the client device.

Even when multiple devices join the network, the security service may prompt the user to power-cycle the multiple devices, and/or toggle the WIFI functionality on the multiple devices, to thereby force the multiple devices to join the network again. Reconnecting to the network will provide the opportunity to identify and tag the multiple devices with meaningful names, respectively. The router can also facilitate this process by prompting the user with additional contextual information, such as a DYNAMIC HOST CONFIGURATION PROTOCOL host name and/or brand or model information of the respective device collected based on traffic from the device.

The disclosed systems and methods may operate according to two separate cases or embodiments. In the first example, the disclosed systems and methods may identify and tag a new device that is going to be connected for the first time to the router. In the second example, the disclosed systems and methods may identify and tag a device that is already connected to the router.

In some examples, the disclosed systems and methods may function through an application that is loaded, or installed, into a user's mobile phone. The application may communicate with the router directly and/or via a cloud security server. Alternatively, as a user interface, the disclosed systems and methods may use webpages (e.g., www.norton.core/tagme), which may be hosted on the cloud security server and/or hosted on the router to accomplish the tagging process. In the following discussion of an example embodiment, the disclosed systems and methods may operate through the mobile device application for purposes of illustration. Nevertheless, the disclosed systems and methods may alternatively use webpages for the user interface in the tagging procedure, as discussed above.

In the first scenario, the disclosed systems and methods may identify and tag a new device that is going to be connected for the first time to the router. The following procedure illustrates the tagging process. First, the user may optionally start the mobile device application, which may send the request to the router to subscribe to a "device-connected" event that is detected by the router within a window of time. The window of time may be on the order of seconds or minutes. Because the window of time may have a link that is relatively short, it will be unlikely for two "device-connected" events to happen within the same window of time. When this does happen, however, the mobile device application may prompt the user to follow the steps according to the second scenario (e.g., corresponding to the tagging of devices that are already connected to the router), which is discussed further below.

The request to the router to subscribe to the "device-connected" event during the window of time may be optional. The request may be omitted in the case that the mobile device application is automatically configured to receive all "device-connected" events detected by the router (e.g., regardless of a window of time).

Second, the user may connect the client device to the router's local area network, WIFI network, or other network, as outlined above. In the example of a WIFI connection, the user may search for a SERVICE SET IDENTIFIER for the router, and then sign into the router using the correct user name and password for the router. Third, the router may discover that the client device is attempting to connect, and then the router may send, or publish, the device information (e.g., a MEDIA ACCESS CONTROL address and/or an INTERNET PROTOCOL address) to the mobile device application.

Fourth, the mobile device application receives the response from the router and prompts the user for a descriptive name for the discovered device. Fifth, in response, the user inputs a descriptive name, such as "camera in backyard" or "light switch in master bedroom," and the mobile device application sends the specific descriptive name, along with the device information, to the router and/or the cloud security server for improved device management, as further discussed above.

In the second scenario, the disclosed systems and methods may tag a device that is already connected to the router. This scenario may occur when a device was signed into the network without going through the tagging process, or was automatically connected as in the case when the device was switched from a retired router to a new router that has the same SERVICE SET IDENTIFIER and password as the old router. Typically, in this case, a number of devices join the network at substantially the same time. Accordingly, the user may not be able to readily identify, or tag, all of these different devices simultaneously. The following procedure illustrates the tagging process in this scenario.

First, the user may start the mobile device application and optionally send a request to the router to subscribe to a "device-connected" event detected by the router within a window of time, as discussed above in parallel for the first scenario. The mobile device application may present an existing list of devices to the user and prompt the user to power-cycle, toggle the network connection, and/or re-connect to the network, using any device the user selects to tag.

Second, in response, the user restarts the device, or toggles the network connection at the device (e.g., pressing the power button or simply cycling the power). If the device is not turned on already, the user may simply turn the device on. For smartphones, the user could toggle the WIFI connection or forget the network and then rejoin the network. Third, the router captures the connection event and sends, or publishes, the device information (e.g., the MEDIA ACCESS CONTROL address and optionally the INTERNET PROTOCOL address, etc.) to the mobile device application.

Fourth, the mobile device application receives the response from the router and prompts the user for a descriptive name of the reconnected device. Fifth, the user in response inputs a descriptive name and the mobile device application sends the descriptive name, along with the device information, to the router and/or the cloud security server for improved device management. One difference between these two scenarios is that the first scenario may involve an initial signing into the network of the router, whereas the second scenario may involve restarting, or reconnecting, one or more network devices that were previously connected to the router.

In view of the above, the disclosed systems and methods may be distinguished from other systems, such as APPLE's HOMEKIT, in the sense that the disclosed systems and methods are applicable to all client devices connected to a router (e.g., all WIFI devices), and the disclosed systems and methods do not require the connecting network devices to implement any logic for the purposes of performing the identification and tagging. The disclosed systems and methods can also be easily extended to protocols such as BLUETOOTH LOW ENERGY and ZIGBEE, simply due to the security service executing at least in part on the primary controller (e.g., the home router or other router).

Figure 5:
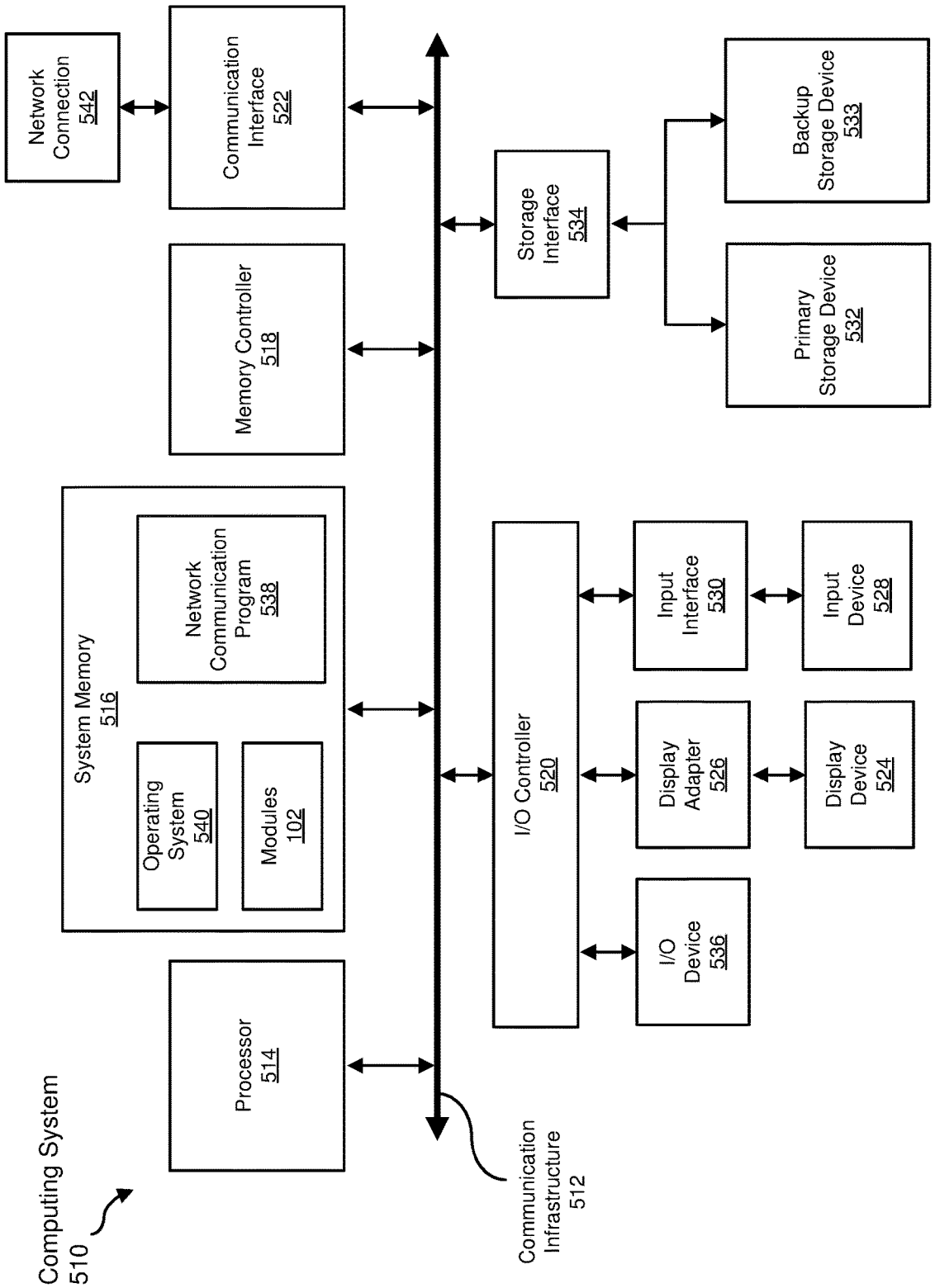
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
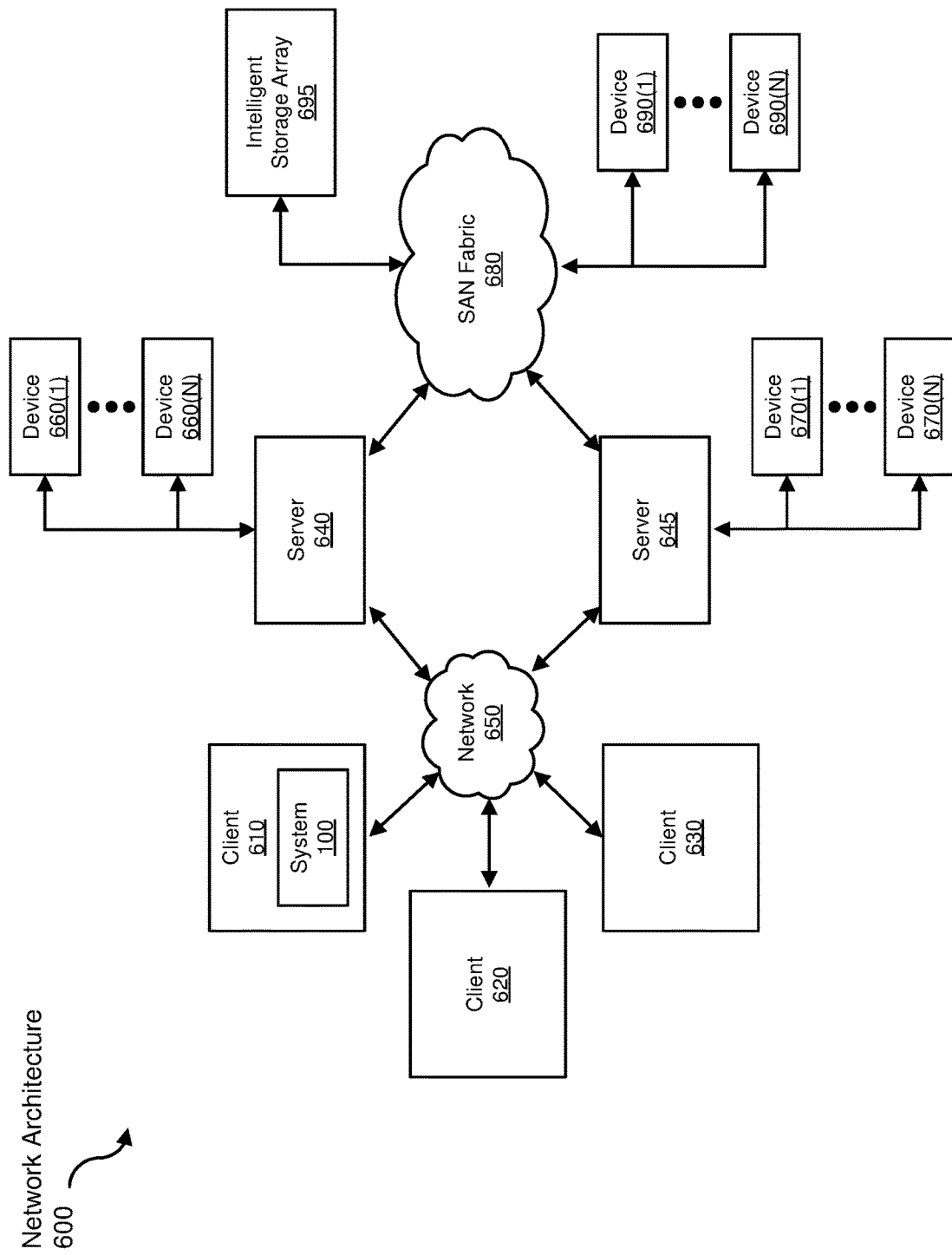
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for tagging client devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a network packet, such as network packet 122, transform one or more items of data contained within the network packet by tagging the items of data in accordance with step 306 of method 300, output a result of the transformation to a display (e.g., in accordance with FIG. 4), output device, or computing memory or storage, and use the result of the transformation to improve device management of client devices connecting to a router, as discussed above. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for tagging client devices, at least a portion of the method being performed by a computing device comprising at least one processor, the method comprising:
    prompting, by a mobile device application, a user to attempt to disconnect and reconnect a client device to a router to which the client device is already connected to enable the user to label the client device with a tag that indicates a specific descriptive name for the client device;
    receiving from the router, in response to the user attempting to disconnect and reconnect the client device to the router based on the prompting from the mobile device application, at least one network packet that indicates that the client device has attempted to connect to the router and that includes device information identifying the client device;
    prompting, automatically in response to receiving the network packet indicating that the client device has attempted to connect to the router, the user to tag the client device with the descriptive name to facilitate management of the client device;
    receiving, in response to prompting the user to tag the client device, the tag that indicates the specific descriptive name for the client device; and
    transmitting, automatically in response to receiving the tag, the specific descriptive name to at least one of the router and a cloud security server to establish, within a security service record, an association between the specific descriptive name and the client device.

2. The computer-implemented method of claim 1, further comprising, prior to receiving the network packet that indicates that the client device has attempted to connect to the router, transmitting a request to the router to subscribe to a device-connected event that occurs within a specified window of time.

3. The computer-implemented method of claim 1, further comprising, prior to receiving the network packet that indicates that the client device has attempted to connect to the router, receiving from the router a list of client devices that are already connected to the router, the list including the client device.

4. The computer-implemented method of claim 3, further comprising prompting the user to reconnect the client device to a network of the router in response to receiving from the router the list of client devices that are already connected to the router.

5. The computer-implemented method of claim 4, further comprising prompting the user to reconnect every device in the list of client devices to the network of the router.

6. The computer-implemented method of claim 1, wherein the router transmits the network packet in response to intercepting the client device attempting to connect to the router.

7. The computer-implemented method of claim 6, wherein the router prevents the client device from connecting to the router until the tag that indicates the specific descriptive name for the client device is received.

8. The computer-implemented method of claim 1, wherein:
    the device information identifying the client device comprises a media access control address of the client device; and
    establishing, within the security service record, the association between the specific descriptive name and the client device comprises establishing an association between the specific descriptive name and the media access control address.

9. The computer-implemented method of claim 1, wherein the router establishes a wireless network according to at least one of the following protocols:
    WIFI;
    BLUETOOTH LOW ENERGY;
    ZIGBEE; and
    Z-WAVE.

10. The computer-implemented method of claim 1, wherein prompting the user to tag the client device with the descriptive name to facilitate management of the client device comprises displaying the device information identifying the client device.

11. A system for tagging client devices, the system comprising:
- a prompting module, stored in memory, that prompts, as part of a mobile device application, a user to attempt to disconnect and reconnect a client device to a router to which the client device is already connected to enable the user to label the client device with a tag that indicates a specific descriptive name for the client device;
- a reception module, stored in memory, that receives from the router, in response to the user attempting to disconnect and reconnect the client device to the router based on the prompting from the mobile device application, at least one network packet that indicates that the client device has attempted to connect to the router and that includes device information identifying the client device;
- wherein the prompting module further prompts, automatically in response to receiving the network packet indicating that the client device has attempted to connect to the router, the user to tag the client device with the descriptive name to facilitate management of the client device;
- wherein the reception module receives, in response to prompting the user to tag the client device, the tag that indicates the specific descriptive name for the client device;
- a transmission module, stored in memory, that transmits, automatically in response to receiving the tag, the specific descriptive name to at least one of the router and a cloud security server to establish, within a security service record, an association between the specific descriptive name and the client device; and
- at least one physical processor configured to execute the reception module, the prompting module, and the transmission module.

12. The system of claim 11, wherein the transmission module transmits, prior to the reception module receiving the network packet that indicates that the client device has attempted to connect to the router, a request to the router to subscribe to a device-connected event that occurs within a specified window of time.

13. The system of claim 11, wherein the reception module receives, prior to receiving the network packet that indicates that the client device has attempted to connect to the router, from the router a list of client devices that are already connected to the router, the list including the client device.

14. The system of claim 13, wherein the prompting module prompts the user to reconnect the client device to a network of the router in response to receiving from the router the list of client devices that are already connected to the router.

15. The system of claim 14, wherein the prompting module prompts the user to reconnect every device in the list of client devices to the network of the router.

16. The system of claim 11, wherein the router transmits the network packet in response to intercepting the client device attempting to connect to the router.

17. The system of claim 16, wherein the router prevents the client device from connecting to the router until the tag that indicates the specific descriptive name for the client device is received.

18. The system of claim 11, wherein:
- the device information identifying the client device comprises a media access control address of the client device; and
- the transmission module establishes, within the security service record, the association between the specific descriptive name and the client device at least in part by establishing an association between the specific descriptive name and the media access control address.

19. The system of claim 11, wherein the router establishes a wireless network according to at least one of the following protocols:
- WIFI;
- BLUETOOTH LOW ENERGY;
- ZIGBEE; and
- Z-WAVE.

20. A non-transitory computer-readable medium comprising one or more computer-readable instructions that, when executed by at least one processor of a computing device, cause the computing device to:
- prompt, by a mobile device application, a user to attempt to disconnect and reconnect a client device to a router to which the client device is already connected to enable the user to label the client device with a tag that indicates a specific descriptive name for the client device;
- receive from the router, in response to the user attempting to disconnect and reconnect the client device to the router based on the prompting from the mobile device application, at least one network packet that indicates that the client device has attempted to connect to the router and that includes device information identifying the client device;
- prompt, automatically in response to receiving the network packet indicating that the client device has attempted to connect to the router, the user to tag the client device with the descriptive name to facilitate management of the client device;
- receive, in response to prompting the user to tag the client device, the tag that indicates the specific descriptive name for the client device; and
- transmit, automatically in response to receiving the tag, the specific descriptive name to at least one of the router and a cloud security server to establish, within a security service record, an association between the specific descriptive name and the client device.

* * * * *